(12) United States Patent
Cheng

(10) Patent No.: US 7,541,713 B2
(45) Date of Patent: Jun. 2, 2009

(54) HEAT SINK

(75) Inventor: Jui-Hung Cheng, Hsin-Chuang (TW)

(73) Assignee: Asia Viatal Components Co., Ltd., Kaohsiung (TW)

( * ) Notice: Subject to any disclaimer, the term of this patent is extended or adjusted under 35 U.S.C. 154(b) by 218 days.

(21) Appl. No.: 11/414,443

(22) Filed: May 1, 2006

(65) Prior Publication Data

US 2007/0252464 A1  Nov. 1, 2007

(51) Int. Cl.
*H02K 1/22* (2006.01)

(52) U.S. Cl. .................. 310/261; 310/67 R; 310/90

(58) Field of Classification Search ............ 310/64, 310/89–90, 67 R, 261, 254
See application file for complete search history.

(56) References Cited

U.S. PATENT DOCUMENTS 6,280,089 B1 * 8/2001 Horng ................ 384/129
6,462,441 B1 * 10/2002 Horng et al. ............ 310/67 R

* cited by examiner

*Primary Examiner*—Thanh Lam

(57) ABSTRACT

A heat dissipating fan comprises a base unit having an axial sleeve, a dynamic bearing having a shaft section, a stator unit securely around the axial sleeve and a rotor unit. The rotor unit has a hub with a through hole to be jointed to the shaft section. A barrel core is positioned at the inner side of the hub corresponding to the through hole for receiving the shaft section. A connection element engages with the shaft section to secure the connection between the hub and the shaft section. Thus, the heat dissipating fan is assembled quickly, easily and precisely.

6 Claims, 4 Drawing Sheets

HEAT SINK

BACKGROUND OF THE INVENTION

1. Field of the Invention

The present invention relates to a heat dissipating fan, and more particularly to a heat dissipating fan that can be assembled easily, precisely and securely.

2. Description of the Related Art

Referring to FIG. 1, to assemble the fan wheel 11 of the conventional heat dissipating fan 1, the shaft 12 of the motor is inserted into the collar 112 disposed at center of the inner side of the hub 111.

The process of assembling the fan wheel 11 to the shaft 12 includes, first, preparing a fan mold (not shown) to vertically receive the shaft 12 in the space reserved for the collar 112. Next, a molten plastic is injected into the mold, and then it is cooled down to form the hub 111 with the collar 112 before the mold is removed. In this way, the shaft 12 is joined to the color 112 of the hub 111.

However, the shortcoming of the preceding process for forming the fan wheel 11 is in that when the molten plastic material is injected in the injection molding process, the shaft 12 is pushed with the injected molten plastic material easily to result in the phenomena of misalignment. Thus, the axial line of the hub 111 is unable to coincide with the axis of the shaft 12, and the fan wheel 11 is incapable of rotating smoothly to deteriorate the heat dissipation effect. Correction of the misaligned shaft 12 would incur extra time and labor due to complexity of the correction process and would substantially increase the overall assembling cost.

FIG. 2 illustrates another conventional process of assembling the shaft 32 of the fan motor and to the fan wheel 31 of the heat dissipating fan 3. First, the fan wheel 31 is formed, and then the shaft 32 of the motor is inserted into the collar 312 with tight fit or glue fastening to complete the assembly.

However, for implementing the process of inserting and adhering the shaft 32 and the collar 312 have to have their dimensions thereof with high precision. Besides, during the assembly process, an end of the shaft 32 must enter the hub 311 and join with the collar 312. However, the joint of the shaft 12 at the collar needs a very strict precision. Otherwise, an unfavorable joint will be created even if there is a little dimension error. Therefore, this conventional process is much more complicated.

SUMMARY OF THE INVENTION

Accordingly, in the view of the foregoing, the present invention provides a heat dissipating fan that can be assembled more easily, precisely and securely. The heat dissipating fan comprises a base unit, a dynamic bearing, a stator unit and a rotor unit. The base unit further comprises a base and an axial sleeve positioned on the base. The dynamic bearing further comprises a bearing body disposed in the axial sleeve and a shaft section positioned at an end of the bearing body. The stator unit is securely positioned around the axial sleeve. The rotor unit is rotatably positioned to surround the stator unit and jointed to the shaft section. The rotor unit further comprises a hub having a through hole at a central region thereof with a barrel core disposed at the inner side thereof to correspond to the through hole for receiving the shaft section, a connection element positioned in the barrel core to engage with the shaft section, a magnetic ring positioned at the inner flange thereof to induce mutually with the stator unit, and a plurality of blades alternately spacing apart around the outer periphery of the hub.

According to an aspect of the present invention, the axis of the hub coincides with that of the dynamic bearing. The shaft section of the dynamic bearing penetrates the barrel core and engages with the connection element in the barrel core. Thus, the shaft section of the dynamic bearing can be secured to the barrel core to simplify the entire assembling process with easiness, preciseness and fastness.

BRIEF DESCRIPTION OF THE DRAWING

For a more complete understanding of the present invention, reference will now be made to the following detailed description of preferred embodiments taken in conjunction with the following accompanying drawings.

DETAILED DESCRIPTION OF THE PREFERRED EMBODIMENTS

Figure 3:
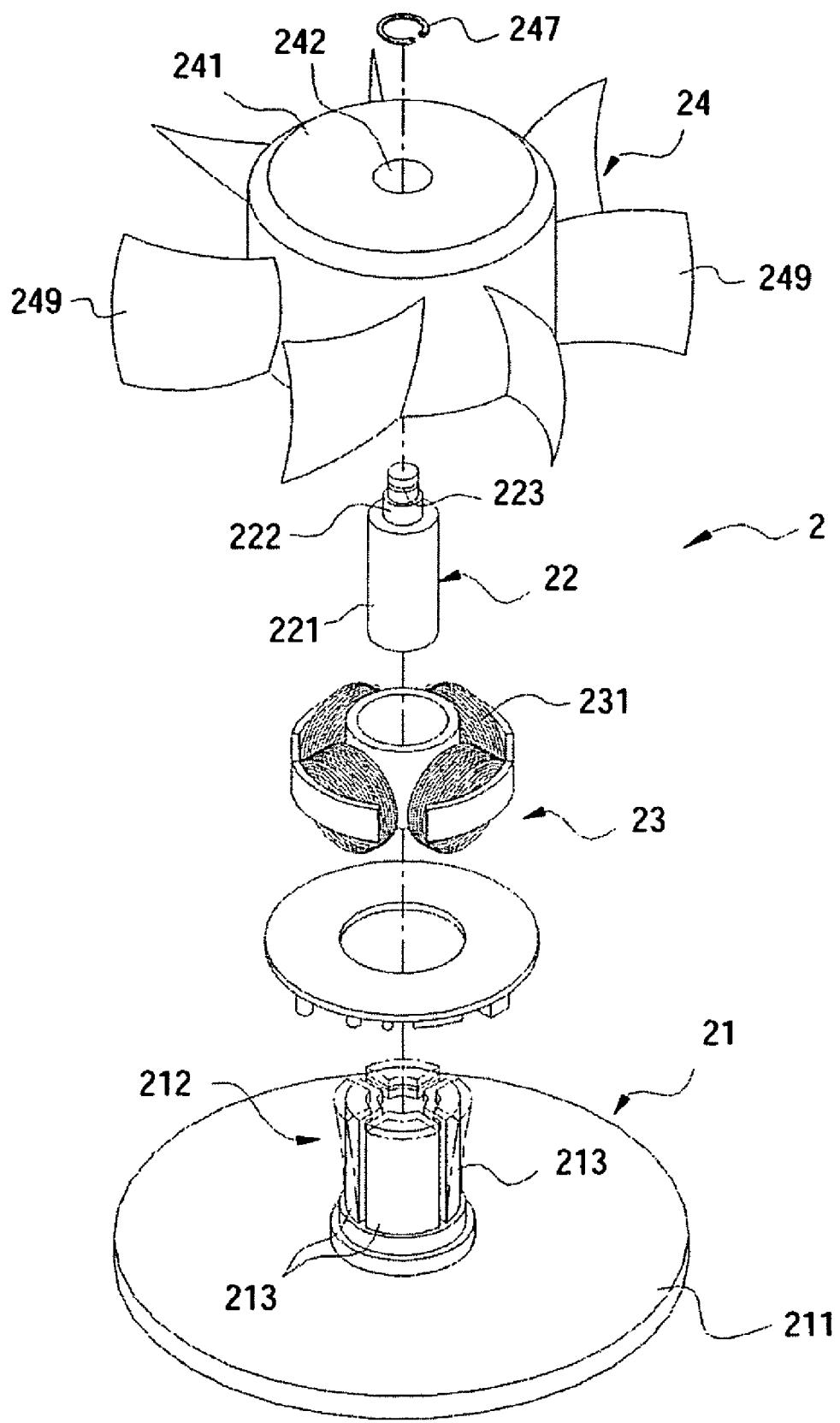
FIG. 3 is an exploded perspective view of a heat dissipating fan according to the first preferred embodiment of the present invention.
Figure 4:
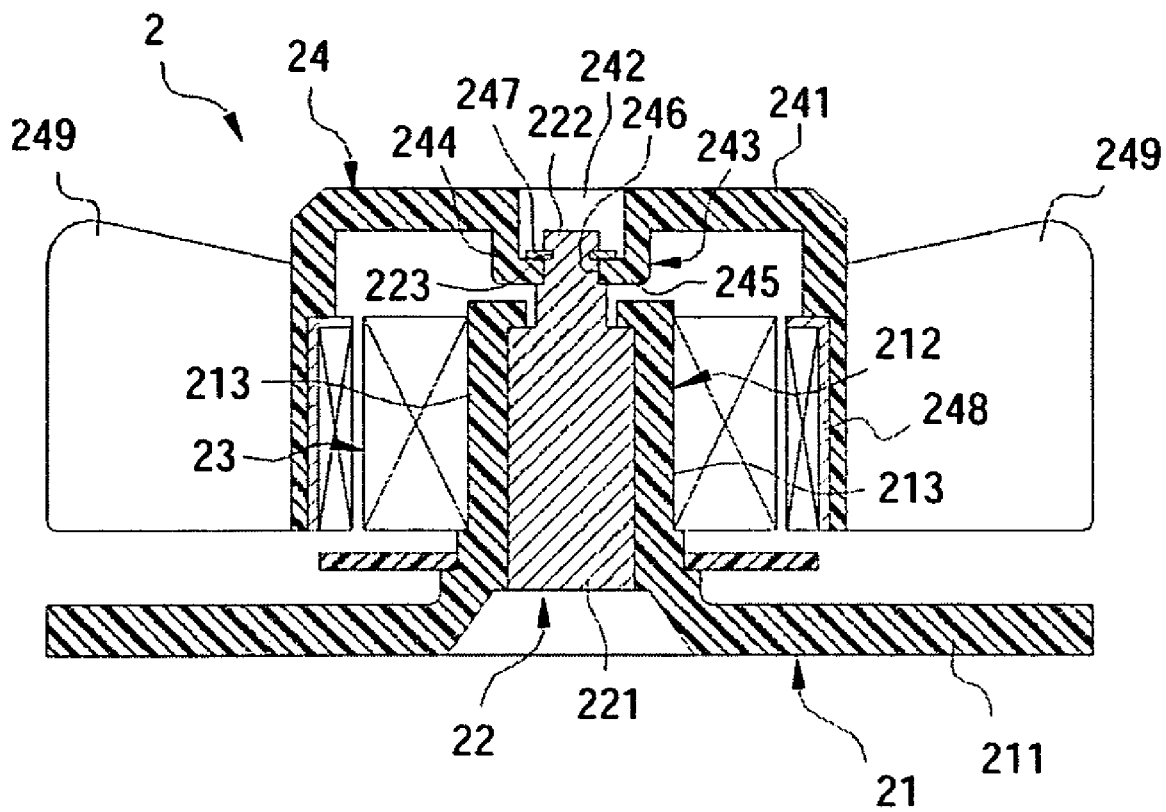
FIG. 4 is a sectional side view of a heat dissipating fan according to the first embodiment of the present invention showing a C-shaped retaining ring being the connection element.

Referring to FIGS. 3 and 4, the heat dissipating fan 2 according to the first preferred embodiment of the present invention comprises a base unit 21, a dynamic bearing 22 positioned in the base unit 21, a stator unit 23 and a rotor unit 24 rotatably attached to the stator unit 23.

The base unit 21 comprises a base 211 and an axial sleeve 212 positioned on the base 211 to receive the bearing 22. The axial sleeve 212 comprises four elastic split sleeve sections 213 circularly positioned with gaps there-between. The distal end of each sleeve section 213 is a right angle bent end towards the motor shaft 22. The four sleeve sections 213 can be obliquely bent outwards and can be restored back to upright position elastically.

The dynamic bearing 22 comprises a bearing body 221 received in the axial sleeve 212, and a shaft section 222 positioned at an end of the bearing body 221 and connected to the rotor unit 24 at a distal end thereof. The bearing body 221 at the end joining with the shaft section 222 is pressingly held by the bent end of the respective sleeve section 213 of the axial sleeve 212. The shaft section 222 has an annular groove 223 formed at a distal end thereof.

The stator unit 23 is a ring set positioned around the axial sleeve 212 of the base unit 21. The rotor unit 24 is rotatable positioned covering the outer periphery of the stator unit 23 and jointed to the shaft section 222 of the dynamic bearing 22. The rotor unit 24 comprises a hub 241 having a through hole 242 at the central region thereof, a barrel core 243 disposed at the center of the hub 241 corresponding to the through hole 242 for being penetrated by the shaft section 222, a connection element 247 securely clamping the annular groove 223 of the shaft section 222, a magnetic ring 248 positioned at a inner side of the hub 241 and capable of inducing mutually with the stator unit 23, and a plurality of blades 249 alternately positioned spaced apart around the outer periphery of the hub 241. In this embodiment, the connection element 247 is an elastic C-shaped retaining ring.

The barrel core 243 of the rotor unit 24 comprises a hollow portion 244 jointed to the inner central position of the hub 241, and a circumferential sidewall 245 horizontally extending from the hollow portion 244 towards the shaft section 222 to hold or support the connection element 247. The sidewall 245 forms an axial hole 246 communicating with the through hole 242 of the hub 241 for facilitating penetration of the axis 222 there-through.

To assemble the heat dissipating fan 2, the sleeve sections 213 of the axial sleeve 212 are forcedly bent outwards for receiving the dynamic bearing 22, and then restored back to upright position for securely covering the circumferential surface and the end surface of the bearing body 221 of the dynamic bearing 22. Next, the rotor unit 24 is positioned to cover the stator unit 23 such that the shaft section 222 of the dynamic bearing 22 penetrates the barrel core 243 via the axial hole 246 in such a way of the sidewall 245 of the barrel core 243 pressing against the shaft section 222. Next, the connection element 247 is lodged into the groove 223 and supported by the barrel core 243 to securely assemble the shaft section 222 to the hub 241 to complete assembly of the heat dissipating fan 2.

When the electric power is supplied to the heat dissipating fan 2, the coil set 231 of the stator unit 23 generates the alternate magnetic field due to the magnetic element 248 of the rotor unit 24 so that the magnetic element 248 rotates smoothly with respect to the shaft section 222 to induce a great deal of air flow for heat dissipation.

Accordingly, the heat dissipating fan 2 of the present invention described above has at least the following advantages.

1. Easy and convenient to be assembled: To assemble the shaft section 222 of the dynamic bearing 22 to the hub 241 of the rotor unit 24, the shaft section 222 is inserted into the barrel core 243 through the axial hole 246, and then the connection element 247 passes through the through hole 242 to lodge into the annular groove 223 to securely assemble the shaft section 222 to the hub 241 of the rotor unit 24.

Thus, the shaft section 222 has the same rotation axis as that of the hub 241. By securing the connection element 247 into groove 223 of the shaft section 222 via the through hole 242 of the hub 241, the heat dissipating fan 2 can be accurately assembled. Therefore, the heat dissipating fan 2 is easily and precisely assembled and thereby to overcome the defects of the conventional heat dissipating fan 1 shown in FIG. 1 and FIG. 2.

2. Precisely being assembled: After forming the hub 241 and the dynamic bearing 22, the connection element 247 fits with the annular groove 223 of the shaft section 222 on the dynamic bearing 22 via the through hole and is supported with the sidewall 245 of the barrel core 243 to precisely assemble the hub 241 to the shaft section 222. Thus, the rotation axis of the axis 222 can precisely coincide with that of the hub 241. The process of assembling the heat dissipating fan is much easier and more precise than that of the conventional heat sink 1 shown in FIG. 1.

3. More secured assembly: The annular groove 223 of the shaft section 222 is provided to receive the connection element 247 and the barrel core 243 of the rotor unit 24 is provided to securely support the connection element 247 for the hub 241 being jointed to the shaft section 222.

Figure 1:
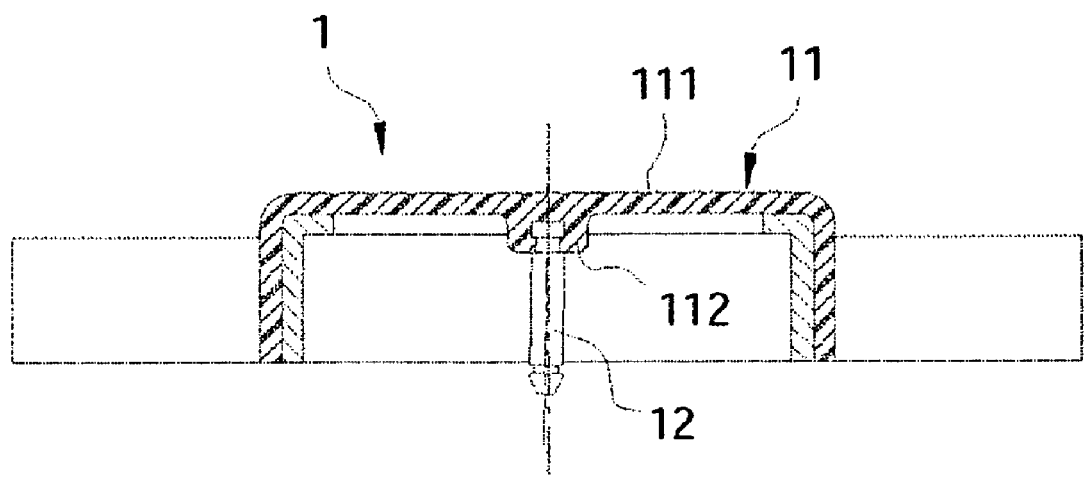
FIG. 1 is a sectional side view of the conventional heat dissipating fan.
Figure 2:
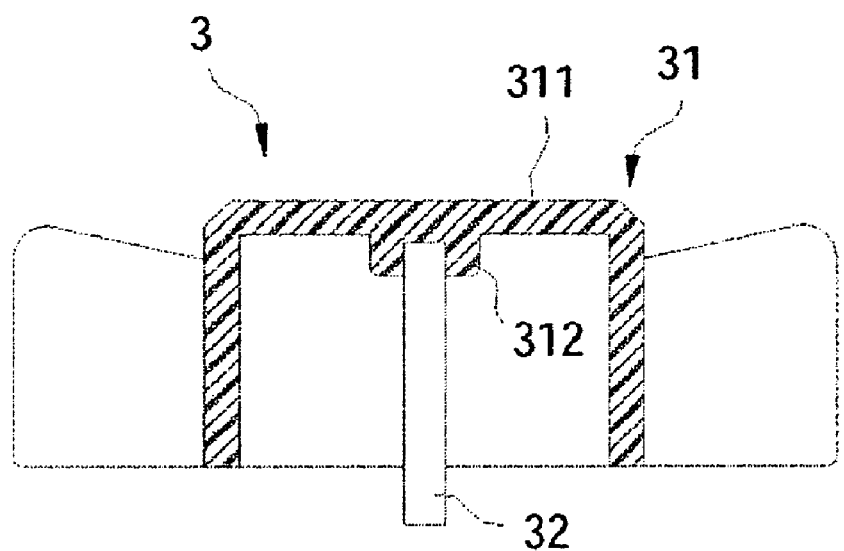
FIG. 2 is a sectional side view of another conventional heat dissipating fan.

4. Smooth operation to provide better heat dissipation effect: As described above, the annular groove 223 of the shaft section 222 is provided to receive the connection element 247 and the barrel core 243 of the rotor unit 24 is provided to securely support the connection element 247 for securely assembling the hub 241 to the shaft section 222 such that the rotation axis of the shaft section 222 can precisely coincide with that of the hub 241. Under this circumference, the rotor unit 24 is capable of running smoothly and steadily to induce more air flow and thereby improve the heat dissipation effect for overcoming the deficiency of the conventional heat dissipating fan 1 as shown in FIG. 1.

Figure 5:
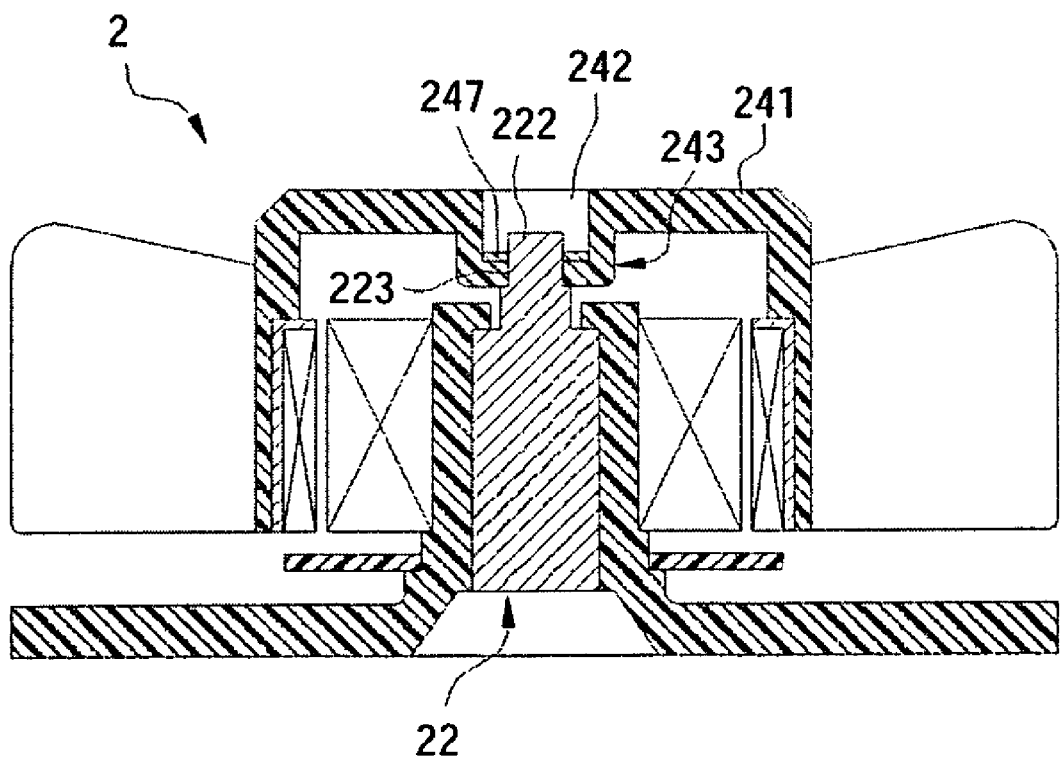
FIG. 5 is a sectional side view of a heat dissipating fan according to the second embodiment of the present invention showing a metallic ring type connection element.

FIG. 5 shows a heat dissipating fan 2 according to the second preferred embodiment of the present invention. It is similar to that of the first embodiment described above except the connection element 247 being a metallic annular ring riveted to the annular groove 223 at the distal end of the shaft section 222 of the dynamic bearing 22 instead of the C-shaped retaining ring engaging with the annular groove 223 done in the first embodiment.

Therefore, after fitting the shaft section 222 with the barrel core 243, the connection element 247 is inserted through the through hole 242 of the hub 241 and securely riveted to the annular groove 223 of the shaft core 222.

Figure 6:
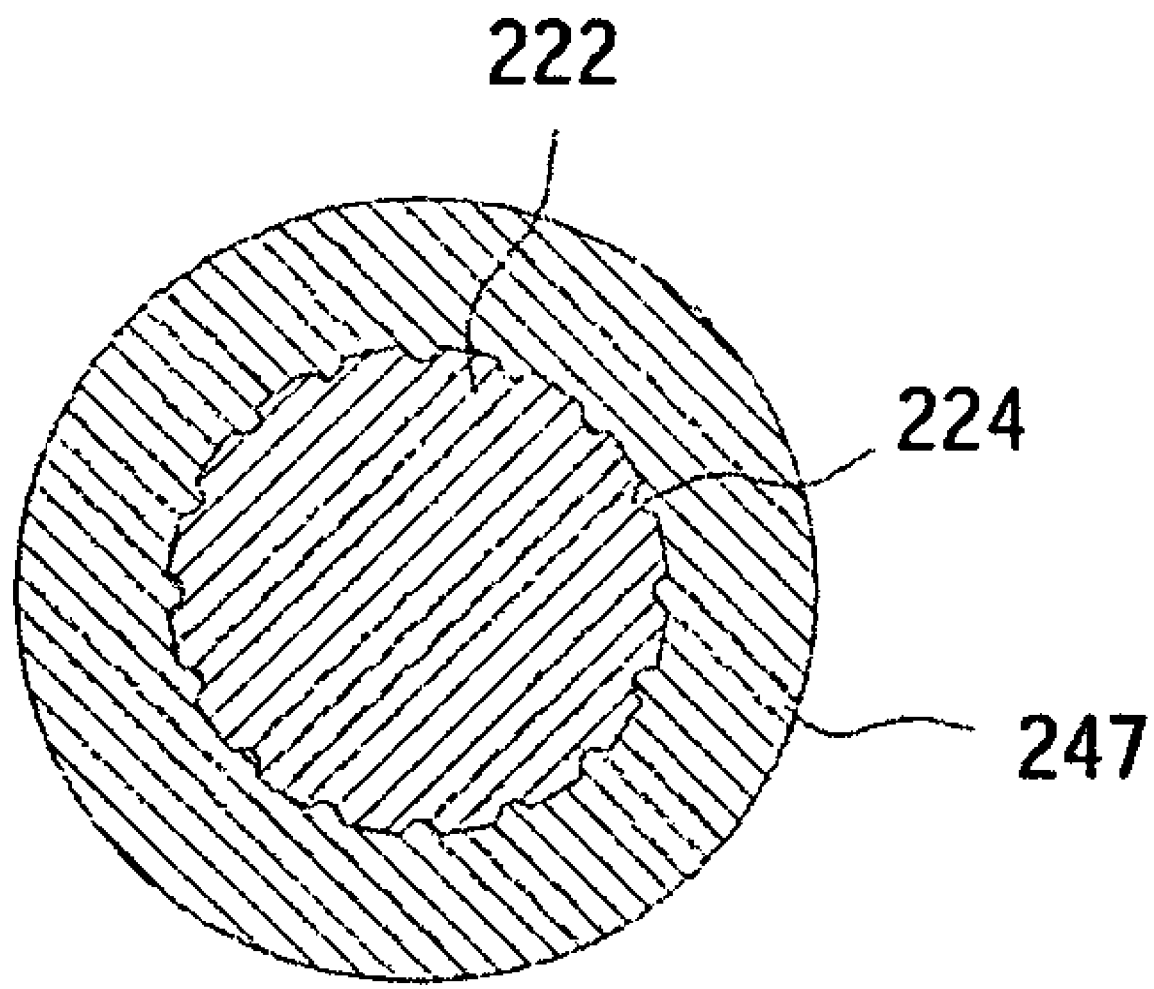
FIG. 6 is a cross section of the shaft of the fan motor having a spline circumference surface according to the third preferred embodiment of the present invention.

FIG. 6 shows the shaft section 222 of a heat dissipating fan according to the third preferred embodiment of the present invention. It is similar to that of the second preferred embodiment described above except the shaft section 222 has a splined surface 224 to increase the surface area on the shaft section 222 for more securely engaging with the connecting element 247.

In summary, the heat dissipating fan 2 of the present invention comprises the hub 241 having the through hole 242, the shaft section 222 of the dynamic bearing 22 being fitted to the barrel core 243 and the connection element 247 engaging with the annular groove 223 to securely position the shaft section 222 of the dynamic bearing 22 in the barrel core 243 such that the rotor unit 24 can be joined to the shaft section 222 precisely, easily and securely and thereby the heat dissipating fan can be assembled efficiently.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

What is claimed is:

1. A heat dissipating fan comprising:
    a base unit further comprising a base and an axial sleeve;
    a dynamic bearing further comprising an bearing body positioned in said axial sleeve and a shaft section positioned at an end of said bearing body;
    a stator unit being coaxially secured around said axial sleeve;
    a rotor unit being rotatably positioned to cover said stator unit and jointed to said shaft section, and further comprising a hub having a through hole at a central region thereof, a barrel core being a hollow portion connected to an inner side of said hub with a sidewall extending from an end of said hollow portion for being penetrated by said shaft section to;
    a connection element being positioned in said barrel core to engage with a distal end of said shaft section;
    a magnetic ring being positioned at the inner side of said hub for mutually inducing with said stator unit; and
    a plurality of blades being alternately positioned to space spaced apart around an outer periphery of said hub;

wherein, said axial sleeve consists of a plurality of elastic split sleeve sections circularly positioned with a gap spacing apart from each other and a distal end of the respective sleeve section being bent a right angle toward said shaft section; and said connection element surrounds a distal end of said shaft section and is supported with said sidewall.

2. The heat dissipating fan according to claim 1, wherein said sidewall has an axial hole corresponding with said through hole for being penetrated by said shaft section.

3. The heat dissipating fan according to claim 1, wherein said shaft section has an annular groove for engaging with said connection element, which is a C-shaped retaining ring.

4. The heat dissipating fan according to claim 1, wherein said connection element is a metallic annular ring riveted to the distal end of said shaft section.

5. The heat dissipating fan according to claim 4, wherein said shaft section has a spline circumferential surface to enhance an engagement between said shaft section and said connection element.

6. The heat dissipating fan according to claim 1, wherein said sleeve sections are capable of being obliquely bent outward for receiving said dynamic bearing and restored back to an original position thereof respectively for holding said bearing body.

* * * * *